United States Patent Office 3,074,976
Patented Jan. 22, 1963

3,074,976
3β-HALO-Δ$^{5,7}$-PREGNADIENES
John A. Zderic, Palo Alto, Calif., and Otto Halpern and Jose Iriarte, Mexico City, Mexico, assignors, by mesne assignments, to Syntex Corporation, a corporation of Panama
No Drawing. Filed Jan. 31, 1962, Ser. No. 170,267
18 Claims. (Cl. 260—397.3)

The present invention relates to certain new cyclopentanophenanthrene derivatives and to a method for making the same.

More particularly the present invention refers to the novel 3β-halo-Δ$^{5,7}$-pregnadienes which may be further substituted at C-17α by a hydroxy or acyloxy group and at C-21 by a fluorine atom, a hydroxyl or an acyloxy group.

The novel compounds of the present invention are represented by the following formula:

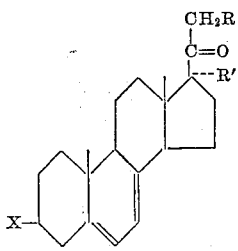

In the above formula X represents fluorine, chlorine or bromine; R represents hydrogen, fluorine, hydroxy or acyloxy and R$^1$ represents hydrogen, hydroxy or an acyloxy group.

The acyloxy groups are derived from a hydrocarbon carboxylic acid of less than 12 carbon atoms, including saturated or insaturated straight or branched chain, aliphatic, cyclic or cyclic aliphatic, optionally substituted with functional groups such as hydroxyl, acyloxy, alkoxy, amino or halogen. Typical ester groups are the formate, acetate, propionate, butyrate, enanthate, caproate, benzoate, hemisuccinate, aminoacetate, trimethylacetate, phenoxyacetate, phenylpropionate and β-chloropropionate.

The novel compounds of the present invention are progestational agents which exhibit particularly anti-estrogenic, anti-androgenic and anti-gonadotrophic activities; they further posses anti-ovulatory properties.

The compounds object of our invention are obtained from the Δ$^5$-3β-hydroxy(acyloxy)pregnenes, introducing a double bond at C-7 by treatment with N-bromosuccinimide, followed by dehydrobromination, saponifying the 3β-acyloxy group when the starting material is an ester and replacing the hydroxyl group at C-3 by a halogen atom.

The 3β-chloro, fluoro and bromo derivatives of Δ5-pregnen-20-one are obtained by the process illustrated by the following equation:

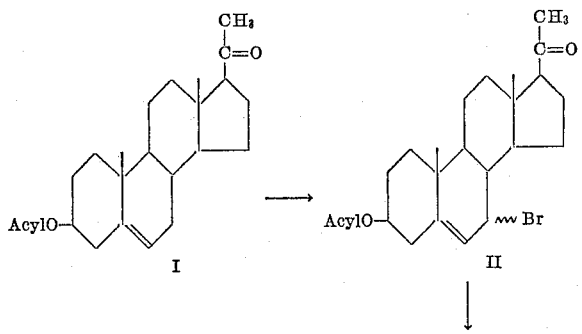

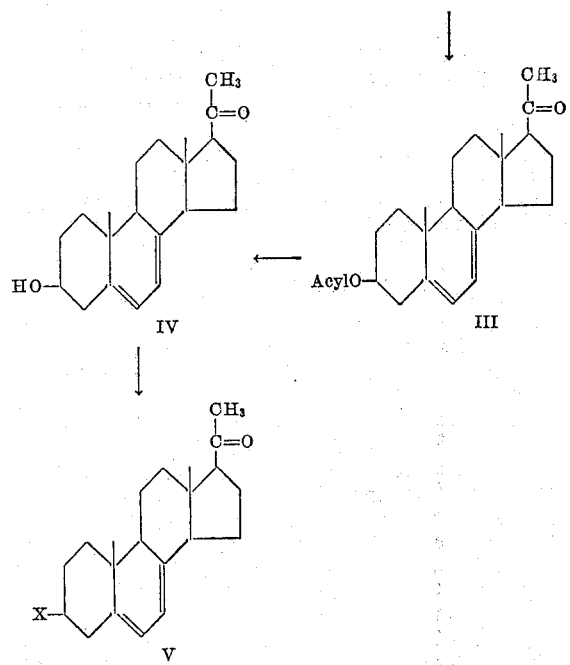

In the above formulas X represents chlorine, bromine or fluorine.

In practicing the process outlined above, an ester of Δ$^5$-pregnen-3β-ol-20-one, preferably the acetate (I) is refluxed for a short period of time with 1.2 molar equivalents of N-bromosuccinimide in the presence of a suitable organic solvent and strongly illuminated with artificial light, to produce the corresponding 7-bromo derivative (II). The reaction is preferably carried out in carbon tetrachloride or hexane as solvent although some other inert solvents may also be used.

The 7-bromo compounds thus produced are then dehydrobrominated by refluxing the same with a tertiary amine, such as collidine, 2,4-lutidine, dimethyl aniline, pyridine or the like, for a period of time of the order of 1 to 2 hours, thus producing Δ$^{5,7}$-pregnadien-3β-ol-20-one acetate or any other ester (III). The dehydrobromination may be alternatively effected by refluxing the 7-bromo compounds with calcium carbonate in dimethyl formamide or dimethyl acetamide, for a short period of time, preferably for 15 to 30 minutes.

Upon saponification with potassium hydroxide in methanol solution, in a conventional manner, there is produced Δ$^{5,7}$-pregnadien-3β-ol-20-one (IV).

In order to obtain the 3β-chloro-Δ$^{5,7}$-pregnadien-3β-ol-20-one (V; X=Cl), the preceding compound is treated with phosphorus pentachloride in an inert solvent, preferably in an aromatic hydrocarbon such as benzene, xylene or toluene, at reflux temperature and for a period of time of the order of 30 minutes to 3 hours, preferably during one hour. When phosphorus pentabromide is used instead of phosphorus pentachloride, there is obtained the corresponding 3β-bromo-Δ$^{5,7}$-pregnadien-20-one (V; X=Br).

By treatment of Δ$^{5,7}$-pregnadien-3β-ol-20-one with anhydrous hydrogen fluoride in mixture with tetrahydrofuran-methylene chloride, there is produced the corresponding 3β-fluoro compound (V; X=F). The reaction is preferably conducted at low temperature between —80° and 0° C. and during 18 to 24 hours.

The 3β-halo-17α-hydroxy(acyloxy)-pregnadienes are obtained by converting the diesters of Δ$^5$-pregnene-3β,17α-diol-20-one, preferably the diacetate, into the corresponding 7-bromo derivative by treatment with N-bromosuccinimide in carbon tetrachloride solution and dehydrobrominating with collidine or calcium carbonate in dimethyl formamide to produce Δ$^{5,7}$-pregnediene-3β,17α-diol-20-one diacetate, which is selectively saponified at C-3 by treatment with potassium hydroxide in methanol solution at room temperature to give the corresponding 17-monoacetate. Upon treatment of this compound with phosphorus pentachloride, phosphorus pentabromide or anhydrous hydrogen fluoride, in the same manner as in the case of the compounds not substituted at C-17α, there are produced the acetate of 3β-chloro-Δ$^{5,7}$-pregnadien-17α-ol-20-one, the acetate of 3β-bromo-Δ$^{5,7}$-pregnadien-17α-ol-20-one and the acetate of 3β-fluoro-Δ$^{5,7}$-pregnadien-17α-ol-20-one, which are then saponified with dilute potassium hydroxide methanolic solution and at reflux temperature to give the corresponding free compounds. Reesterification of these with acid anhydrides or chlorides of less than 12 carbon atoms in benzene solution and in the presence of p-toluenesulfonic acid give rise to other esters of 3β-chloro, 3β-bromo and 3β-fluoro-Δ$^{5,7}$-pregnadien-17α-ol-20-one.

In a similar manner, starting from the 3,21-diacetate of Δ$^5$-pregnene-3β,21-diol-20-one, there is produced the corresponding diacetate of Δ$^{5,7}$-pregnadiene-3β,21-diol-20-one via the 7-bromo derivative, which is then saponified by treatment with potassium hydroxide or potassium carbonate at room temperature, to afford Δ$^{5,7}$-pregnadien-3β-21diol-20-one. The above compound is then selectively acetylated at C-21 by treatment with 1.1 molar equivalents of acetic anhydride in pyridine solution and at 0° C. overnight. The resulting 21-monoacetate is then reacted with phosphorus pentachloride or phosphorus pentabromide in benzene solution or with anhydrous hydrogen fluoride in mixture with tetrahydrofuranmethylene chloride, thus producing the acetates of 3β-chloro, 3β-bromo and 3β-fluoro-Δ$^{5,7}$-pregnadien-21-ol-20-one, which may be saponified with dilute potassium hydroxide or potassium carbonate in methanol solution and at low temperature, and optionally reesterified by treatment with acid anhydrides or chlorides of less than 12 carbon atoms and in the presence of pyridine.

The 3β-halo derivatives of Δ$^{5,7}$-pregnadiene-17α,21-diol-20-one are obtained by the method illustrated by the following equation:

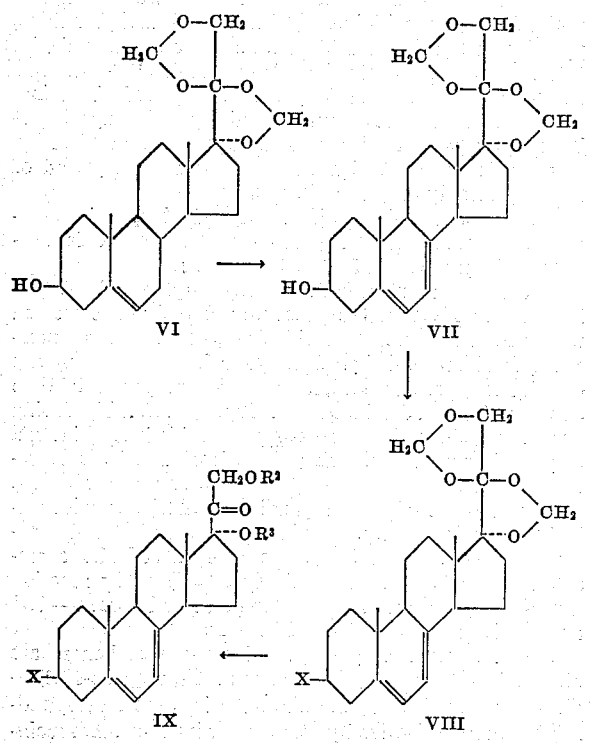

In the above formulas X has the same meaning as previously set forth, R$^2$ and R$^3$ represent hydrogen or an acyl group of less than 12 carbon atoms.

In practicing the process set forth above in the 17,20; 20,21-bismethylenedioxy derivative of Δ$^5$-pregnene-3β, 17α,21-triol-20-one (VI), there is introduced a double bond at C-7 by bromination with N-bromosuccinimide followed by dehydrobromination as previously described, and the resulting 17,20;20,21-bismethylenedioxy-Δ$^{5,7}$-pregnadien-3β-ol (VII) is then reacted with phosphorus pentachloride, phosphorus pentabromide or hydrogen fluoride thus producing the corresponding 3β-halo compound (VIII). The bismethylenedioxy group is hydrolyzed by treatment with 60% formic acid to give 3β-chloro-Δ$^{5,7}$-pregnadiene-17α,21 - diol-20-one, 3β - bromo-Δ$^{5,7}$-pregnadiene-17α,21-diol-20-one and 3β-fluoro-Δ$^{5,7}$-pregnadien-17α,21-diol-20-one (IX; R$^2$ and R$^3$=hydrogen).

Upon esterification of these compounds with acid anhydrides or chlorides of the type previously mentioned, in pyridine solution, there are produced the corresponding 21-monoesters (IX; R$^2$=acyl, R$^3$=hydrogen). When the esterification is effected in benzene solution and in the presence of p-toluenesulfonic acid, there are produced the 17,21-diesters (IX; R$^2$ and R$^3$=acyl).

The 3β-halo-21-fluoro-Δ$^{5,7}$-pregnadien-20-one derivatives are obtained by converting an acylate of Δ$^{5,7}$-pregnadien-3β-ol-20-one (III), preferably the acetate, into the 21-iodo compound (X), by treatment with iodine and calcium oxide in mixture of tetrahydrofuran-methanol. Substitution of the iodine for a fluorine atom, by treatment with silver fluoride in aqueous acetonitrile affords the 21-fluoro-Δ$^{5,7}$-pregnadien-3β-ol-20-one acetate, which is then saponified and the free compound thus obtained (XI) is treated with phosphorus pentachloride, phosphorus pentabromide or hydrogen fluoride, thus producing 3β-chloro-21-fluoro-Δ$^{5,7}$-pregnadien-20-one, 3β - bromo - 21 - fluoro-Δ$^{5,7}$-pregnadien-20-one and 3β,21-difluoro-Δ$^{5,7}$-pregnadien-20-one respectively (XII).

The above described method is illustrated by the following sequence of reactions:

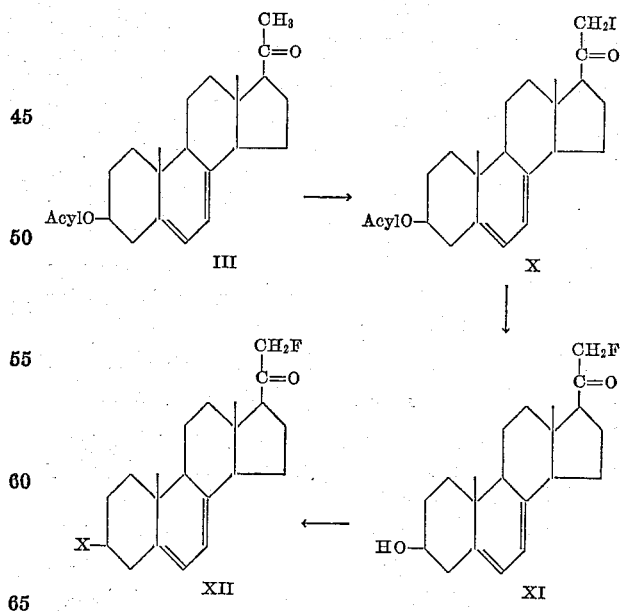

In the above formulas X has the same meaning as previously set forth.

The 3β-halo-21-fluoro-Δ$^{5,7}$-pregnadien-17α-ol-20-one derivatives, as well as the corresponding esters are obtained by the same sequence of reactions, but starting with a 3,17-diester of Δ$^{5,7}$-pregnadiene-3β,17α-diol-20-one. Alternatively these compounds may also be obtained from the acetate of 17,20;20,21-bismethylenedioxy-Δ$^{5,7}$-pregnadien-3β-ol, which is hydrolyzed with 60% formic acid to give Δ$^{5,7}$-pregnadiene-3β,17α,21-triol-20 - one - 3 - acetate.

The latter compound is then converted into the corresponding 3-acetate-21-tosylate, and the tosyloxy group is replaced by a fluorine atom by treatment with sodium iodide, followed by reaction with silver fluoride in acetonitrile. The 21-fluoro-$\Delta^{5,7}$-pregnadiene-3$\beta$,17$\alpha$-diol-20-one-3-acetate thus obtained is then esterified at C-17 by treatment with acid anhydrides or chlorides in benzene solution and in the presence of p-toluenesulfonic acid, the acetate group at C-3 is selectively saponified and finally substituted by a fluorine, chlorine or bromine atom, as described previously.

The following examples serve to illustrate but are not intended to limit the scope of the present invention:

Example I

From a solution of 10 g. of $\Delta^5$-pregnen-3$\beta$-ol-20-one acetate in 100 cc. of carbon tetrachloride, there were distilled 20 cc. of solvent to remove moisture by azeotropic distillation. 5.9 g. of N-bromosuccinimide was then added (1.2 molar equivalents) and the mixture was heated to boiling by the use of an electric lamp, which at the same time illuminated strongly the reaction mixture. After 5 minutes of reflux the mixture was cooled and filtered to remove the succinimide formed during the reaction. The filtrate was evaporated to dryness under reduced pressure avoiding heat, thus giving the 7-bromo-$\Delta^5$-pregnen-3$\beta$-ol-20-one-acetate, which was used for the next step without further purification.

The above crude compound was refluxed with 100 cc. of $\gamma$-collidine for 2 hours under an atmosphere of nitrogen. It was then cooled, poured into a 2 N solution of hydrochloric acid, extracted with ethyl acetate and the organic solution washed to neutral, dried over anhydrous sodium sulfate and evaporated to dryness to give the crude $\Delta^{5,7}$-pregnadien-3$\beta$-ol-20-one-acetate. This crude product was suspended in 250 cc. of 1% methanolic potassium hydroxide solution and stirred for 3 hours at 0–5° C. under an atmosphere of nitrogen. It was then diluted with water, and the formed precipitate collected by filtration. After crystallization from benzene-alcohol, there was obtained $\Delta^{5,7}$-pregnadien-3$\beta$-ol-20-one.

To a solution of 5 g. of $\Delta^{5,7}$-pregnadien-3$\beta$-ol-20-one in 100 cc. of benzene, there were added 5 g. of phosphorus pentachloride and the resulting mixture was refluxed for 1 hour in the absence of moisture. It was then cooled and poured into water; the benzene layer was washed with water several times, dried over anhydrous sodium sulfate and evaporated to dryness. Crystallization of the residue from acetone-hexane yielded 3$\beta$-chloro-$\Delta^{5,7}$-pregnadien-20-one.

Example II

In accordance with the method of bromination described in the preceding Example, 5 g. of $\Delta^5$-pregnene-3$\beta$,21-diol-20-one-diacetate was treated with N-bromosuccinimide, thus giving 7-bromo-$\Delta^5$-pregnene-3$\beta$,21-diol-20-one-diacetate.

A solution of the above bromo compound in 40 cc. of cold dimethylformamide was added to a suspension of 5 g. of finely divided calcium carbonate in 75 cc. of refluxing dimethylformamide. The mixture was refluxed for 30 minutes further, cooled and filtered. The filtrate was diluted with water and extracted with ethyl acetate. The extract was washed with dilute hydrochloric acid, water, aqueous sodium bicarbonate solution and water, then dried over anhydrous sodium sulfate and evaporated to dryness. Recrystallization of the residue from methylene chloride-methanol gave $\Delta^{5,7}$-pregnadiene-3$\beta$,21-diol-20-one diacetate.

A solution of 2 g. of the above compound in 50 cc. of methanol was treated with a cc. of a 4% aqueous solution of potassium hydroxide; the reaction mixture was stirred for 2 hours under an atmosphere of nitrogen at room temperature; the mixture was neutralized with acetic acid and the methanol distilled under reduced pressure. The residue was triturated with water and the solid collected, washed with water, dried and recrystallized from ethyl acetate-methanol, thus producing $\Delta^{5,7}$-pregnadiene-3$\beta$,21-diol-20-one.

A solution of 1 g. of the latter compound in 5 cc. of pyridine was treated with 0.34 g. of acetic anhydride (1.1 equivalents) and the mixture kept at 0° C. for 18 hours. It was then diluted with water, extracted with methylene chloride and the organic extract washed with dilute hydrochloric acid and water to neutral, dried over anhydrous sodium sulfate and evaporated to dryness. Crystallization from acetone-hexane gave $\Delta^{5,7}$-pregnadiene-3$\beta$,21-diol-20-one-21-monoacetate.

500 mg. of the above compound were treated with phosphorus pentachloride, in accordance with the method rescribed in Example 1, thus giving the acetate of 3$\beta$-chloro-$\Delta^{5,7}$-pregnadien-21-ol-20-one.

Example III

In accordance with the bromination method of Example I, but using hexane instead of carbon tetrachloride as solvent, 10. g. of the diacetate of $\Delta^5$-pregnene-3$\beta$,17$\alpha$-diol-20-one were converted into the 7-bromo derivative, which upon dehydrobromination with calcium carbonate in dimethylformamide gave $\Delta^{5,7}$-pregnadiene-3$\beta$,17$\alpha$-diol-20-one-diacetate.

A solution of 2 g. of the above compound in 50 cc. of methanol was treated with 400 mg. of potassium hydroxide in 2 cc. of water, and the reaction mixture kept at room temperature for one hour. It was then neutralized with acetic acid, concentrated to ⅓ its volume under vacuum, poured into water and the formed precipitate collected by filtration. There was thus obtained the 17-acetate of $\Delta^{5,7}$-pregnadiene-3$\beta$,17$\alpha$-diol-20-one.

Upon treatment of the above compound with phosphorus pentachloride in benzene solution, by following the method of Example I, there was obtained 3$\beta$-chloro-$\Delta^{5,7}$-pregnadien-17$\alpha$-ol-20-one-acetate.

Example IV

In accordance with the method described in Example I, 5 g. of 17,20;20,21-bismethylenedioxy-$\Delta^5$-pregnen-3$\beta$-ol obtained by treatment of $\Delta^5$-pregnene-3$\beta$,17$\alpha$,21-triol-20-one with formaldehyde in the presence of hydrochloric acid by following the method described in U.S. Patent No. 2,888,456, were converted into the corresponding 7-bromo derivative, which in turn was dehydrobrominated with collidine to give 17,20;20,21-bismethylenedioxy-$\Delta^{5,7}$-pregnadien-3$\beta$-ol. The latter compound was then treated with phosphorus pentachloride, thus giving 3$\beta$-chloro-17,20;20,21-bismethylenedioxy-$\Delta^{5,7}$-pregnadiene.

A mixture of 1 g. of the preceding compound and 20 cc. of 60% formic acid was heated on the steam bath for 1 hour; it was then cooled, diluted with water and the formed precipitate collected by filtration. Recrystallization from acetone-ether gave 3$\beta$-chloro-$\Delta^{5,7}$-pregnadiene-17$\alpha$,21-diol-20-one.

A mixture of 1 g. of the latter compound, 4 cc. of pyridine and 2 cc. of acetic anhydride was kept at room temperature overnight, poured into ice water, the formed precipitate was filtered, washed with water and dried. Crystallization from acetone-hexane gave 3$\beta$-chloro-$\Delta^{5,7}$-pregnadiene-17$\alpha$,21-diol-20-one-21-acetate.

By the same method of esterification, but using propionic, caproic and undecenoic anhydrides as esterifying agents, there were obtained the corresponding 21-esters of 3$\beta$-chloro-$\Delta^{5,7}$-pregnadiene-17$\alpha$,21-diol-20-one.

Example V

A mixture of 5 g. of 17,20;20,21-bismethylenedioxy-$\Delta^{5,7}$-pregnadiene-3$\beta$-ol, intermediate in the preceding example, 20 cc. of pyridine and 10 cc. of acetic anhydride was heated on the steam bath for 1 hour, poured into water and the precipitate collected by filtration, thus giving the acetate of 17,20;20,21-bismethylenedioxy-$\Delta^{5,7}$-pregnadien- 3β-ol. The above compound was hydrolyzed with 60% formic acid, in accordance with the method described in the preceding example to afford Δ$^{5,7}$-pregnadiene-3β,17α,21-triol-20-one-3-acetate.

A solution of 3.4 g. of the above compound in 20 cc. of a mixture chloroform-pyridine (9:1) was cooled to 0° C. and mixed with 1.4 g. of tosyl chloride which was added in small portions. The reaction mixture was kept for 14 hours at 0° C. and then it was washed with dilute hydrochloric acid, water and sodium bicarbonate solution and the chloroform was evaporated under vacuum. The residue, consisting of the crude 21-tosylate-3-acetate of Δ$^{5,7}$-pregnadiene-3β,17α,21-triol-20-one was dissolved in 20 cc. of acetone and treated at room temperature and under stirring with 4 g. of sodium iodide. After decolorizing the mixture by the addition of sodium thiosulfate solution the product was precipitated by the addition of water and the crystalline 21-iodo derivative was collected by filtration. The crude product was dried in vacuum, dissolved in 20 cc. of acetonitrile and treated dropwise with 1.4 g. of silver fluoride dissolved in 3 cc. of water. After a short time, silver iodide started to separate leaving the 21-fluoro-pregnadiene derivative in solution. The mixture was kept for 24 hours at room temperature and filtered. Concentration of the filtrate under vacuum gave a crude product which after crystallization from methanol-acetone yielded the pure 21-fluoro compound, namely 21-fluoro-Δ$^{5,7}$-pregnadiene-3β,17α-diol-20-one-3-acetate.

To a solution of 2 g. of the above 21-fluoro compound in 40 cc. of anhydrous benzene, there were added 400 mg. of p-toluenesulfonic acid and 4 cc. of a propionic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 21-fluoro-Δ$^{5,7}$-pregnadiene-3β,17α-diol-20-one-3-acetate-17-propionate.

The above compound was selectively hydrolyzed at C-3, in accordance with the saponification method described in Example III, thus producing 21-fluoro-Δ$^{5,7}$-pregnadiene-3β,17α-diol-20-one-17-propionate.

Upon treatment of the latter compound with phosphorus pentachloride, in accordance with the method of Example I, there was obtained 3-chloro-21-fluoro-Δ$^{5,7}$-pregnadien-17α-ol-20-one propionate.

Example VI

To a solution of 1 g. of Δ$^{5,7}$-pregnadien-3β-ol-20-one in 20 cc. of benzene was added 1 g. of phosphorus pentabromide and the resulting mixture was refluxed for 1 hour in the absence of moisture. It was then cooled, poured into water; the benzene layer was washed with water several times, dried over anhydrous sodium sulfate and evaporated to dryness. Crystallization of the residue from acetone-hexane yielded 3β-bromo-Δ$^{5,7}$-pregnadien-20-one.

In a similar manner, Δ$^{5,7}$-pregnadiene-3β,21-diol-20-one-21-monoacetate (intermediate in Example II) and Δ$^{5,7}$-pregnadiene-3β,17α-diol-20-one-17-acetate (intermediate of Example III) were converted respectively into 3β-bromo-Δ$^{5,7}$-pregnadien-21-ol-20-one acetate and 3β-bromo-Δ$^{5,7}$-pregnadien-17α-ol-20-one acetate.

Example VII

A mixture of 1 g. of 21-fluoro-Δ$^{5,7}$-pregnadiene-3β,17α-diol-20-one-3-acetate, obtained as described in Example V, 20 cc. of acetic acid, 10 cc. of acetic anhydride and 1 g. of p-toluenesulfonic acid was kept at room temperature for 1 hour; it was then diluted with water, stirred for 30 minutes at room temperature to hydrolyze the excess of anhydride, and extracted several times with methylene chloride. The organic extract was washed with 10% sodium carbonate solution and water to neutral, dried over anhydrous sodium sulfate and evaporated to dryness. Recrystallization from acetone-hexane gave the 3,17-diacetate of 21-fluoro-Δ$^{5,7}$-pregnadiene-3β,17α-diol-20-one.

The above compound was selectively hydrolyzed at C-3, in accordance with the saponification method of Example III, and the resulting 21-fluoro-Δ$^{5,7}$-pregnadiene-3β,17α-diol-20-one-17-acetate treated with phosphorus pentabromide, by applying the method described in the preceding example, thus producing 3β-bromo-21-fluoro-Δ$^{5,7}$-pregnadien-17α-ol-20-one-acetate.

Example VIII

To a mixture of 16.7 g. of anhydrous hydrofluoric acid and 28.1 g. of anhydrous tetrahydrofuran, previously cooled to −80° C. in a Dry Ice-acetone bath, there was carefully added a suspension of 2 g. of Δ$^{5,7}$-pregnadien-3β-ol-20-one in 30 cc. of methylene chloride. The resulting mixture was stirred during 1 hour at −80° C. and kept standing at 0° C. overnight. It was then poured into ice water and neutralized with sodium carbonate. The organic layer was separated and the aqueous layer extracted several times with methylene chloride. The combined organic extracts were washed with water to neutral, dried over anhydrous sodium sulfate and evaporated to dryness under reduced pressure. The residue was chromatographed on 100 g. of washed alumina. The fractions eluted with hexane-benzene (80:20) gave the desired 3β-fluoro-Δ$^{5,7}$-pregnadien-20-one.

Example IX

By applying the fluorination method described in the preceding example, Δ$^{5,7}$-pregnadiene-3β,17α-diol-20-one-17-acetate, intermediate of Example III, was converted into 3β-fluoro-Δ$^{5,7}$-pregnadien-17α-ol-20-one-acetate.

A mixture of 2 g. of the latter compound and 60 cc. of 0.5% methanolic potassium hydroxide solution was refluxed for 2 hours under nitrogen atmosphere. The resulting solution was then neutralized with acetic acid, concentrated under vacuum to a small volume and diluted with water. The formed precipitate was collected by filtration, washed with water and dried, thus affording 3β-fluoro-Δ$^{5,7}$-pregnadien-17α-ol-20-one.

To a solution of 500 mg. of the preceding 3β-fluoro compound in 10 cc. of anhydrous benzene, there were added 100 mg. of p-toluenesulfonic acid and 2 cc. of cyclopentylpropionic anhydride and the mixture was allowed to stand for 48 hours at room temperature, poured into ice and water, and the resulting mixture stirred for 15 minutes to effect hydrolysis of the excess anhydride. The benzene layer was separated and washed with 10% sodium carbonate solution and water. Drying, evaporation and crystallization of the residue from ether-hexane produced 3β-fluoro-Δ$^{5,7}$-pregnadien-17α-ol-20-one-17-cyclopentylpropionate.

In a similar manner, but using caproic and butyric anhydride as esterifying agents, there were produced the caporate and butyrate of 3β-fluoro-Δ$^{5,7}$-pregnadien-17α-ol-20-one.

Example X

In accordance with the method of fluorination described in Example VIII, 2 g. of 17,20;20,21-bismethylenedioxy-Δ$^{5,7}$-pregnadien-3β-ol, intermediate of Example IV, were treated with anhydrous hydrogen fluoride in a mixture of methylene chloride-tetrahydrofuran, thus giving 3β-fluoro-17,20;20,21-bismethylenedioxy-Δ$^{5,7}$-pregnadiene.

The bismethylenedioxy group was then hydrolyzed with 60% formic acid, by following the method described in Example IV to produce 3β-fluoro-Δ$^{5,7}$-pregnadiene-17α,21-diol-20-one.

Upon treatment of the above compound with acetic acid in pyridine solution, in a conventional manner, there was produced 3β-fluoro-Δ$^{5,7}$-pregnadiene-17α,21-diol-20-one-21-monoacetate.

Example XI

A mixture of 1 g. of 3β-chloro-Δ$^{5,7}$-pregnadiene-17α,21-diol-20-one obtained as described in Example IV, 20 cc. of benzene, 4 cc. of acetic anhydride and 200 mg. of p-toluenesulfonic acid was kept at room temperature for 24 hours. It was then poured into water and stirred for 15 minutes to hydrolyze the excess of anhydride. The benzene layer was separated and washed with 10% sodium carbonate solution and water to neutral, dried over anhydrous sodium sulfate and evaporated to dryness. Crystallization from acetone-hexane gave 3β-chloro-Δ$^{5,7}$-pregnadiene-17α,21-diol-20-one-diacetate.

By the same method, 3β-fluoro-Δ$^{5,7}$-pregnadiene-17α,21-diol-20-one was converted into its diacetate.

Example XII

A cooled solution of 4 g. of Δ$^{5,7}$-pregnadien-3β-ol-20-one-acetate obtained as described in Example I, in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving 21-iodo-Δ$^{5,7}$-pregnadien-3β-ol-20-one-acetate.

The above compound was then treated with silver fluoride in aqueous acetonitrile, by following the method described in Example V, to produce 21-fluoro-Δ$^{5,7}$-pregnadien-3β-ol-20-one-acetate. Upon saponification of the latter compound in accordance with the method of Example III, there was obtained 21-fluoro-Δ$^{5,7}$-pregnadien-3β-ol-20-one, which was then heated with phosphorus pentachloride in benzene solution, thus affording 3β-chloro-21-fluoro-Δ$^{5,7}$-pregnadien-20-one.

Example XIII 1 g. of 21-fluoro-Δ$^{5,7}$-pregnadien-3β-ol-20-one was treated with anhydrous hydrofluoric acid in mixture with tetrahydrofuranmethylene chloride, by following the method of Example VIII to produce 3β,21-difluoro-Δ$^{5,7}$-pregnadien-20-one.

Example XIV

By following the saponification method described in Example IX, the acetate of 3β-chloro-Δ$^{5,7}$-pregnadien-17α-ol-20-one was refluxed for 2 hours with 0.5% methanolic potassium hydroxide solution to give the corresponding free compound which was reesterified with caproic anhydride in benzene solution and in the presence of p-toluenesulfonic acid, thus producing 3β-chloro-Δ$^{5,7}$-pregnadien-17α-ol-20-one caproate.

We claim:
1. A compound of the following formula:

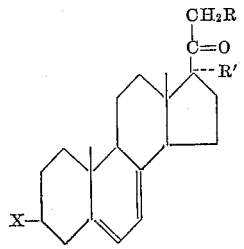

wherein X is selected from the group consisting of fluorine, chlorine and bromine; R is selected from the group consisting of hydrogen, fluorine, hydroxy and acyloxy of less than 12 carbon atoms; and R$^1$ is selected from the group consisting of hydrogen, hydroxy and acyloxy of less than 12 carbon atoms.

2. 3β-chloro-Δ$^{5,7}$-pregnadien-20-one.
3. 3β-bromo-Δ$^{5,7}$-pregnadien-20-one.
4. 3β-fluoro-Δ$^{5,7}$-pregnadien-20-one.
5. 3β-chloro-Δ$^{5,7}$-pregnadien-17α-ol-20-one.
6. 3β-fluoro-Δ$^{5,7}$-pregnadien-17α-ol-20-one.
7. 3β-chloro-Δ$^{5,7}$-pregnadien-17α,21-diol-20-one.
8. 3β-fluoro-Δ$^{5,7}$-pregnadiene-17α,21-diol-20-one.
9. 3β-chloro-21-fluoro-Δ$^{5,7}$-pregnadien-20-one.
10. 3β,21-difluoro-Δ$^{5,7}$-pregnadien-20-one.
11. 3β-chloro-Δ$^{5,7}$-pregnadien-21-ol-20-one.
12. The acetate of 3β-chloro-Δ$^{5,7}$-pregnadien-21-ol-20-one.
13. The acetate of 3β-bromo-Δ$^{5,7}$-pregnadien-21-ol-20-one.
14. The acetate of 3β-bromo-Δ$^{5,7}$-pregnadien-17α-ol-20-one.
15. The propionate of 3β-chloro-21-fluoro-Δ$^{5,7}$-pregnadien-17α-ol-20-one.
16. The 21-caproate of 3β-chloro-Δ$^{5,7}$-pregnadiene-17α,21-diol-20-one.
17. The cyclopentylpropionate of 3β-fluoro-Δ$^{5,7}$-pregnadien-17α-ol-20-one.
18. The 17,21-diacetate of 3β-fluoro-Δ$^{5,7}$-pregnediene-17α,21-diol-20-one.

No references cited.